United States Patent [19]

Walsh

[11] Patent Number: 5,138,975
[45] Date of Patent: Aug. 18, 1992

[54] STORAGE OR TRANSPORT SYSTEM FOR SMALL MARINE CREATURES

[76] Inventor: James S. Walsh, 3222 Nassau, Corpus Christi, Tex. 78418

[21] Appl. No.: 758,573

[22] Filed: Sep. 12, 1991

[51] Int. Cl.⁵ .................................................. A01K 61/00
[52] U.S. Cl. ........................................................ 119/3; 43/56
[58] Field of Search ................. 119/3, 5; 43/55, 56, 43/57; 220/468

[56] References Cited

U.S. PATENT DOCUMENTS

| | | | |
|---|---|---|---|
| 2,020,536 | 11/1935 | Cox | 43/56 |
| 2,032,274 | 2/1936 | Fonos | 43/56 |
| 2,594,172 | 4/1952 | Huffman et al. | 43/56 |
| 2,595,726 | 5/1952 | Swanbeck | 43/56 |
| 2,613,843 | 10/1952 | Suda | 43/56 |
| 2,652,807 | 9/1953 | Washburn | 119/3 |
| 2,761,239 | 9/1956 | Stamps | 43/56 |
| 3,339,305 | 9/1967 | Smith | 43/56 |

Primary Examiner—Paul J. Hirsch
Assistant Examiner—Thomas Price
Attorney, Agent, or Firm—G. Turner Moller

[57] ABSTRACT

A storage system for small marine creatures includes a container having a lid providing a passage therethrough and a skirt extending downwardly into the container. The skirt includes an imperforate section dividing the container into a first section open to the passage and a second section separate from the passage. The shirt also includes a lower mesh section juxtaposed to the container walls to keep the marine creatures in the first section where they are accessible through the lid passage. Oxygen is added through the lid into the second section to provide oxygen rich water. The oxygen rich water in the second section mixes with water in the first section to keep the marine creatures alive.

17 Claims, 1 Drawing Sheet

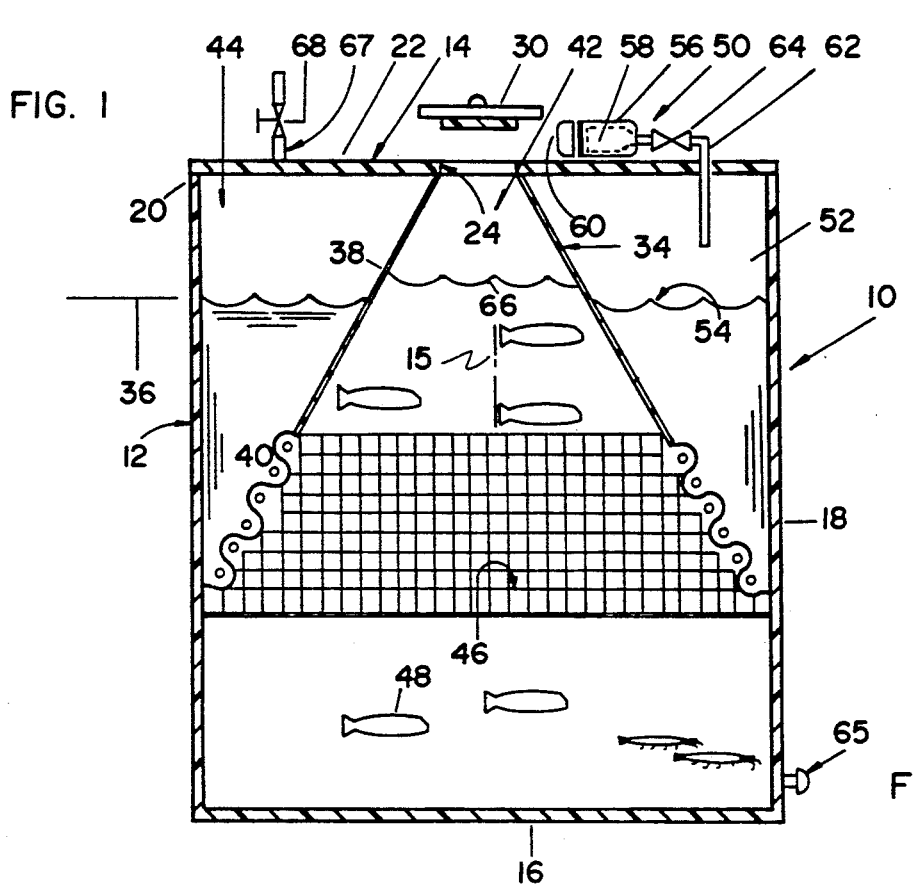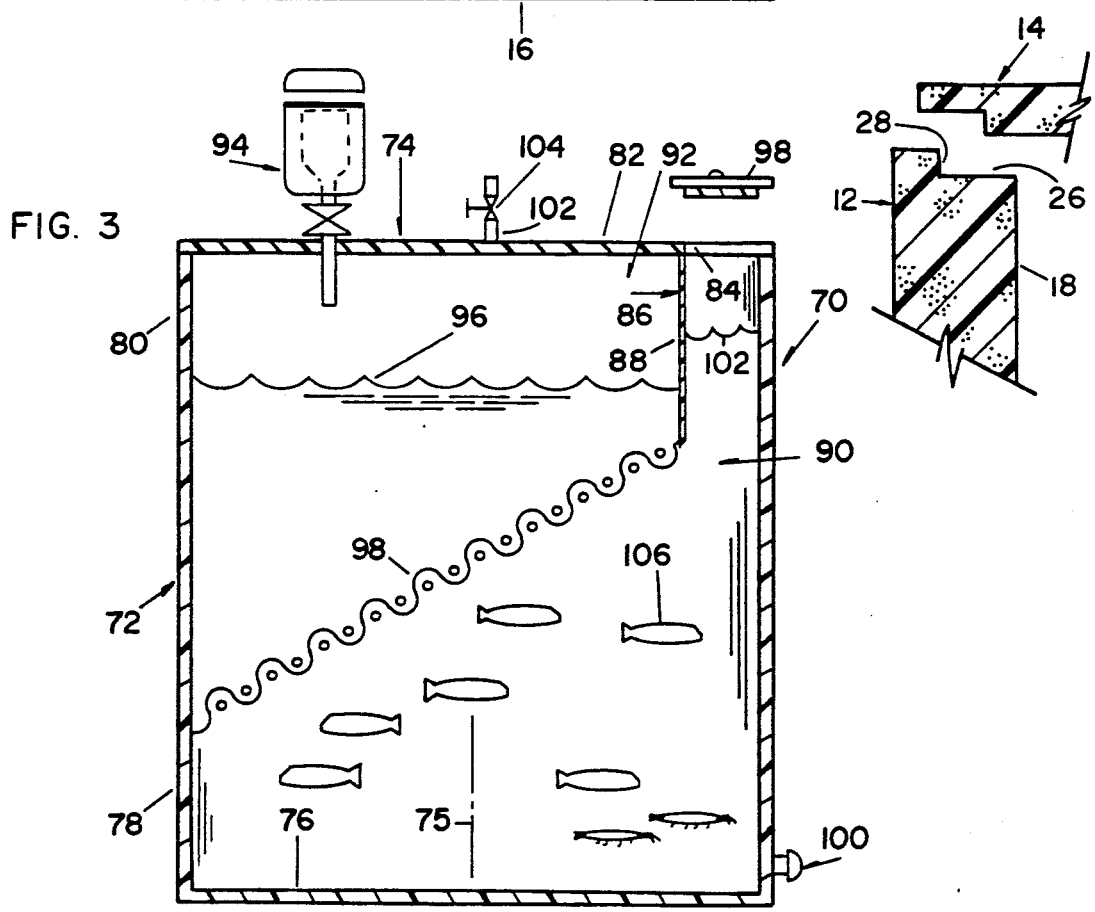

STORAGE OR TRANSPORT SYSTEM FOR SMALL MARINE CREATURES

This invention relates to a storage or transport system for small marine creatures such as live bait which may be shrimp or minnows, fish fingerlings and the like. The system may be a small bait bucket or a larger device for transporting fingerlings from a spawning pond.

There are a variety of devices for keeping bait or small marine creatures alive during transportation. The simplest arrangement is a BAGGIE or ZIPLOK closable container full of water and minnows to which oxygen has been added. This technique is widely used by pet stores to package minnows so customers can keep them alive during the trip home to an aquarium. Another type live bait bucket, used by fishermen, includes an air pump driven off the battery of a boat or car. One device of this type which is of some interest relative to this invention is found in U.S. Pat. No. 2,757,916. Another type live bait bucket includes means for oxygenating a volume above an air-water interface and below a lid providing means for withdrawing bait from the bucket without losing the oxygen. It is this type device to which this invention most nearly relates. Devices of this type are found in U.S. Pat. Nos. 3,339,305; 3,726,039 and 3,903,636.

The storage system of this invention includes an open top container of any suitable type having a lid closing the open top. The container is filled with water to a predetermined level. The lid provides a passage therethrough and a downwardly extending skirt extending below the predetermined level to divide the container into a first section open to the passage and a second section sealed by the skirt passing into the water. The small marine creatures stored or transported in the device are placed into the container through the passage. Oxygen is added to the second sealed section through a valve in the lid.

The skirt downwardly diverges in the container and includes an upper imperforate section and a lower perforate or mesh section juxtaposed to the container side walls. The first container section, i.e. that open to the passage, is thus relatively large and the mesh section tends to keep the marine creatures out of the relatively inaccessible sealed section. Thus, the openings in the mesh section are preferably smaller than the marine creatures stored in the device. In a preferred embodiment of the invention, the imperforate section downwardly diverges into the container so gaseous exhalations of the marine creatures escape to the atmosphere rather than mingling with the oxygen in the sealed section.

It is an object of this invention to provide an improved storage and transport system for small marine creatures.

Another object of this invention is to provide a storage and transport system for small marine creatures which includes a relatively large container section from which the creatures may be readily placed and withdrawn and a relatively small oxygenated container section from which the marine creatures are excluded.

These and other objects of this invention will become more fully apparent as this description proceeds, reference being made to the accompanying drawing and appended claims.

IN THE DRAWINGS

FIG. 1 is a vertical cross-sectional view of a storage system of this invention;

FIG. 2 is an enlarged view of the junction of the lid and container of FIG. 1;

FIG. 3 is a vertical cross-sectional view of another embodiment of this invention.

Referring to FIGS. 1-2, the storage system 10 of this invention includes, as major components, a container 12 and a lid 14. The container 12 may be of any suitable size and shape and provides a central axis 15, a bottom 16, a side wall 18 and an open top 20 closed by the lid 14. Where the storage system 10 is intended to be used as a bait bucket, the container 12 is of bait bucket size and configuration. As shown in FIG. 2, the container 12 may be made of a foam material providing substantial thermal insulating qualities. Where the storage system 10 is intended to be used as a fingerling transporter, the container 12 is of transporter size and configuration.

While the container 12 is of conventional size and shape, the lid 14 is of unusual construction including a wall 22 spanning and closing the periphery of the open top 20 and providing a passage 24 therethrough. Although the junction of the lid 14 and container 16 may be of any suitable type, one convenient construction provides a ledge 26 in the upper end of the side wall 18 and an adjoining vertical wall 28 as shown best in FIG. 2.

The passage 24 is preferably selectively closed by a cover or cap 30 pivotally or removably connected to the lid 14 in any suitable fashion. The lid 14 also provides a skirt 34 which downwardly diverges relative to the container side wall 18. In use, the container 12 is partially filled with water to a predetermined level 36. The skirt 34 includes an upper imperforate section 38 sealed about the passage 24 and a lower perforate section or mesh 40. The upper imperforate section 38 extends downwardly into the container 16 below the predetermined water level 36.

In the embodiment of FIGS. 1-2, the skirt 34 is frustoconical and downwardly diverges relative to the container side wall 18 to divide the container 16 into a first section 42 open to the passage 24 and a second annular section 44 separated from the passage 24 as explained more fully hereinafter. The imperforate section 38 is preferably made of a relatively rigid plastic material. The perforate section 40 is conveniently made of a relatively bodily flexible mesh material in which the mesh openings 46 are smaller than the minimum dimension of the marine creatures 48 in the storage system 10. When assembled, the perforate section 40 juxtaposes or abuts the container side wall 18 so the marine creatures 48 are confined to the first section 42 of the container 12. The creatures 48 are thus accessible to the user rather than being hidden and out of reach in the section 44. This is particularly desirable when it is realized that many marine creatures are attracted to oxygen rich water. Thus, the prior art devices tend to accumulate bait in the inaccessible areas near an air space 52 above the water level 54 in the second section 44.

The lid 14 also provides means 50 for oxygenating the space 52. Although the means 50 may be of any suitable type, it conveniently comprises a housing 56 for receiving an oxygen cartridge 58 and a threaded closure 60 for sealing against the housing 56 and advancing the cartridge 58 into piercing engagement with a sharp point (not shown) inside the housing 56. This allows oxygen in the cartridge 58 to escape through a conduit 62 opening into the space 52 above the water level 54. A suitable valve 64 may be provided in the conduit 62 as desired.

The container 12 preferably includes a drain plug 65 for discharging water. A purge conduit 67 having a manual or check valve 68 therein may be provided to purge air from the space 52 as oxygen is delivered to provide higher oxygen concentration above the water level 54.

Use of the system 10 will now be apparent. The container 16 is filled with water to the level 36 or thereabouts. The lid 14 is placed on the container 12 in sealing engagement with the shoulder 26 and/or wall 28. The marine creatures 48 are placed in the first section 42 of the container 12. An oxygen cartridge 58 is placed in the housing 56 and the closure 60 is manipulated to deliver oxygen into the space 52 above the water level 54. This raises the pressure slightly in the sealed section 44 thereby depressing the water level 54 in the section 44 and raising the water level 66 in the first section 42.

If much higher oxygen concentrations are desired, the purge valve 68 is opened while oxygen is delivered to the space 52 and, after much of the air is displaced from the space 52, the purge valve 68 is closed to accumulate oxygen. An alternate procedure to create very high oxygen concentration in the space 52 is to substantially completely fill the container 12 with water and then simultaneously drain some of the water out of the container 12 through the drain plug 68 while delivering oxygen into the space 52 above the falling water level.

When the container 12 is not being moved, there is sufficient transfer of oxygen across the air-water interface to oxygenate the water to keep the marine creatures 48 alive. When the container 12 is being transported, there is more than sufficient agitation of the water to provide mixing of the relatively over-oxygenated water in the section 44 with the relatively under-oxygenated water in the section 42. Any gaseous exhalations from the marine creatures 48 are directed by the imperforate skirt section 38 through the passage 24 to the atmosphere. If the user wants to remove the marine creatures 48 from the container 12 one or two at a time, as in a bait bucket, access is provided through the passage 24 for either the user's hand or a small net (not shown). If it is desired to remove all of the marine creatures 48 from the container 12 at one time, the lid 14 may be removed and the water and marine creatures 48 poured into another receptacle.

The conical skirt 34 of FIG. 1 works very well with a cylindrical container or a container having a cylindrical section near the lower end of the mesh section 40. For containers of rectangular configuration, for example, the bottom of the mesh section 40 needs to extend to adjacent the container wall to keep the marine creatures 48 in the container section accessible through the opening 24.

Referring to FIG. 3, there is illustrated another approach to applying this invention to a rectilinear container. A storage system 70 of this invention includes a container 72 and a lid 74. The container 72 is conveniently rectilinear, such as square or rectangular in cross-section, and provides a central axis 75, a bottom wall 76, facing side walls 78 and a open top 80. The lid 74 includes a top panel 82 permanently closing the container top 80 and includes a passage 84 therethrough. A downwardly divergent skirt 86 includes an upper imperforate section 88 dividing the container 72 into a first section 90 open to the passage 84 and a second section 92 which is oxygenated by means 94 similar to the oxygenation means 50. The imperforate section 88 is a relative flat panel bonded to the side wall 78 from the lid panel 82 to a location below the water line 96. The skirt 86 includes a lower perforate or mesh section 98 extending from the lower end of imperforate section 88 to adjacent the side wall 78 on a side of the container 72 away from the opening 84. The opening 84 may be closed by a suitable cover 98.

The container 72 preferably includes a drain plug 100 for discharging water. A purge conduit 102 having a manual or check valve 104 therein may be provided to purge air from the space above the water level 96 as oxygen is delivered to provide higher oxygen concentration above the water level 96.

Use of the storage system 70 is substantially identical to the system 10 and should now be apparent. The container 72 is filled with water through the opening 84 to the level 96 or thereabouts. The marine creatures 106 are placed in the first section 90 of the container 72 through the opening 84. Oxygen is delivered into the second section 92 of the container 72 by the means 94. This raises the pressure slightly in the sealed section 92 thereby depressing the water level 96 in the section 92 and raising the water level 102 in the first section 90. Higher oxygen concentrations may be achieved by the same methods as with the system 12.

If it is desired to remove all of the marine creatures from the container 72 at one time, the water and marine creatures are simply poured into another receptacle. If it is desired to remove a few of the marine creatures, they may be retrieved through the opening 84.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A storage system for marine creatures, comprising
 a container having an open top, a bottom and side walls for receiving water to a predetermined depth adjacent the top; and
 a lid for the container having a passage therethrough providing a path of placement and removal for the creatures and including
  a skirt including
   an upper imperforate section extending downwardly from the lid to a level below the predetermined depth for dividing the container into a first container section open to the passage for receiving the marine creatures therein and a second container section for receiving an oxygen charge above the predetermined depth, the skirt upper section providing a water seal between the first and second sections separating the second container section from the passage, and
   a lower perforate section extending laterally to juxtapose the container side wall,
  means sealing between the lid and the second container section providing a gas tight compartment for the oxygen charge; and
 means opening into the second section for delivering oxygen thereto.

2. The storage system of claim 1 wherein the upper section downwardly diverges relative to the container.

3. The storage system of claim 1 wherein the skirt is frustoconical and diverges downwardly relative to the container.

4. The storage system of claim 3 wherein the lower perforate section comprises an extension of the upper imperforate section.

5. The storage system of claim 3 wherein the lower perforate section comprises a lower end and the container includes a cylindrical section adjacent the lower perforate section lower end.

6. The storage system of claim 1 wherein the upper skirt section diverges relative to a central axis at a first angle and the lower skirt section diverges relative to the central axis at a second angle approximately equal to the first angle.

7. The storage system of claim 1 wherein the container is generally cylindrical and the skirt is frustoconical and downwardly diverging.

8. The storage system of claim 1 wherein the upper skirt section extends downwardly from the lid relative to a central axis at a first angle and the lower skirt section extends relative to the central axis at a second angle greater than the first angle.

9. The storage container of claim 1 wherein the container is generally rectangular and the upper skirt section extends across and is bonded to the container.

10. The storage system of claim 9 wherein the upper skirt section extends downwardly from the lid relative to a central axis at a first angle and the lower skirt section extends relative to the central axis at a second angle greater than the first angle.

11. The storage system of claim 9 wherein the upper skirt section is a generally planar panel.

12. The storage system of claim 1 wherein the oxygen delivering means comprises a housing for receiving therein a pressurized container of oxygen, means for opening the pressurized oxygen container and a conduit connecting the housing to the lid at a location opening into the second container section.

13. The storage system of claim 1 wherein the oxygen delivering means comprises a valve opening through the lid into the second container section.

14. The storage system of claim 13 further comprising a second valve opening through the lid into the second container section.

15. The storage system of claim 13 further comprising a valved drain opening into the container adjacent the bottom thereof.

16. The storage system of claim 1 wherein
the upper imperforate section extends downwardly from the lid to a level below the predetermined depth at a first location spaced from the container side wall for dividing the container into a first container section open to the passage and a second container section separated from the passage, and
a lower perforate section connects to the upper imperforate section at the first location and extends laterally toward the container side wall to a second location juxtaposed to the container side wall, the perforate section providing communication between the first and second container sections and allowing the transfer of oxygen rich water from the second section to the first section and substantially preventing the marine creatures from entering the first section.

17. The storage system of claim 1 further comprising means sealing the lid passage.

* * * * *